(12) United States Patent
Toyama et al.

(10) Patent No.: US 8,841,868 B2
(45) Date of Patent: Sep. 23, 2014

(54) SPHERICAL ULTRASOUND MOTOR AND CONTROL METHOD FOR A SPHERICAL ULTRASOUND MOTOR

(75) Inventors: Shigeki Toyama, Tokyo (JP); Masahiko Hoshina, Tokyo (JP)

(73) Assignee: National University Corporation Tokyo University of Agriculture and Technology, Tokyo (JP)

( * ) Notice: Subject to any disclaimer, the term of this patent is extended or adjusted under 35 U.S.C. 154(b) by 511 days.

(21) Appl. No.: 13/255,623

(22) PCT Filed: Mar. 10, 2010

(86) PCT No.: PCT/JP2010/054049
§ 371 (c)(1),
(2), (4) Date: Dec. 22, 2011

(87) PCT Pub. No.: WO2010/104130
PCT Pub. Date: Sep. 16, 2010

(65) Prior Publication Data
US 2012/0119684 A1    May 17, 2012

(30) Foreign Application Priority Data
Mar. 10, 2009  (JP) .................... 2009-057086

(51) Int. Cl.
*H02P 1/00*    (2006.01)

(52) U.S. Cl.
USPC ................. 318/114; 318/119; 310/316.01

(58) Field of Classification Search
USPC ........ 318/114, 119, 123; 310/316.01, 323.06, 310/320, 322
See application file for complete search history.

(56) References Cited

U.S. PATENT DOCUMENTS 5,247,220 A  *  9/1993  Miyazawa et al. ........ 310/323.05
5,521,455 A  *  5/1996  Miyazawa et al. ........ 310/323.04
6,300,705 B1 * 10/2001  Komoda et al. .......... 310/323.12
6,509,673 B2 *  1/2003  Komoda ................... 310/323.12

FOREIGN PATENT DOCUMENTS

| JP | 09-285154 | 10/1997 |
| JP | 11-084526 | 3/1999 |
| JP | 11-262279 | 9/1999 |
| JP | 2002-199749 | 7/2002 |

OTHER PUBLICATIONS

International Search Report for corresponding International Application No. PCT/JP2010/054049, Jun. 8, 2010.

* cited by examiner

*Primary Examiner* — Rina Duda
(74) *Attorney, Agent, or Firm* — Ditthavong & Steiner, P.C.

(57) ABSTRACT

A substantially spherical rotor can be controlled with accuracy even in a relatively low speed rotation. In controlling rotational motions of a rotor 3 of a spherical ultrasonic motor 1, phases of voltages to be applied to three stators 9a, 9b, 9c are determined to set the direction of a rotation axis of the rotor 3. Frequencies of voltages to be applied to the three stators 9a, 9b, 9c are adjusted to control the rotation speed of the rotor 3. Thereby, control with high accuracy is enabled in a relatively low speed rotation.

8 Claims, 9 Drawing Sheets

SPHERICAL ULTRASOUND MOTOR AND CONTROL METHOD FOR A SPHERICAL ULTRASOUND MOTOR

TECHNICAL FIELD

The present invention relates to a spherical ultrasound (ultrasonic) motor that has degrees of freedom in multiple directions and that rotates a rotated member such as an image pickup unit, a robot arm, etc., and a control method for the spherical ultrasonic motor.

BACKGROUND ART

Heretofore, as an applied product of an ultrasonic motor, a spherical ultrasonic motor (spherical actuator) is available, which is constituted of a substantially spherical rotor and a plurality of ring-like stators contacting surfaces of the rotor and rotatably supporting the rotor. Each stator is constituted by attaching a piezoelectric element constituted of a piezoelectric ceramic to a ring-like metal. The piezoelectric element has an electrode pattern including an A-phase and a B-phase, and the polarization polarity of the electrode pattern is made so as to alternately differ in the circumferential direction of the ring-like stator by a polarization treatment. If two-phase high-frequency voltages which are different in phase by 90 degrees are applied to the A-phase and B-phase of the electrode pattern of the piezoelectric element, respectively, the stator is put in a resonant condition at a predetermined frequency. As a result, travelling waves due to flexural vibrations are generated in the stator, and the rotor pressurized by the stator is rotated by friction forces. Thus, in a spherical ultrasonic motor, surface wave vibrations generated by plural stators are conveyed to a rotor, and the rotor is rotated in multiple directions by the surface wave vibrations.

By the way, speed control of an ultrasonic motor is carried out basically by two methods, that is, a method controlling phases of voltages applied to piezoelectric elements constituting stators, and a method controlling frequencies of the voltages applied to the piezoelectric elements.

The phase refers to a phase difference of a two-phase voltage which is applied to a stator (piezoelectric element) which generates vibrations. Vibrations on the surface of the stator become standing waves (the rotor does not rotate) when the phase difference of a two-phase voltage which is applied to a stator is 0°, and when the phase difference is 90°, the vibrations on the surface of the stator become traveling waves (the amplitude is constant and the rotor swiftly rotates). Using this phenomenon, it is practiced to control the rotation speed of a rotor by adjusting phase differences of two-phase voltages which are applied to stators.

On the other hand, in the method controlling the rotation speed of a rotor by adjusting frequencies of two-phase voltages applied to stators, when frequencies of applied voltages are resonant frequencies of the stators, the rotor rotates most often, and as the frequencies of the applied voltages are shifted from the resonant frequencies, the rotation speed of the rotor decreases, and the rotor stops in due course of time. Using this, it is practiced to control the rotation speed of a rotor by controlling frequencies of two-phase voltages applied to stators.

By the way, the spherical ultrasonic motor is configured such that a substantially spherical rotor is held, for example, by three disk-like stators, and the rotor is rotated around a resultant vector of angular velocity vectors of respective stators. Heretofore, by adjusting phases of two-phase voltages applied to the three stators, the rotation axis direction and the rotation speed of the rotor have been controlled. This is because that in the case of a spherical ultrasonic motor, when controlling stators based on frequencies of two-phase voltages applied to the stators, if the frequencies are small, amplitudes of surface wave vibrations become small and interference between the stators is strong, so that generation of a rotation axis of the rotor has been difficult, and also the rotation speed of the rotor has been unstable.

As an example of controlling a spherical actuator based on phases of two-phase voltages applied to stators, for example, a control technology is disclosed, in which rotation of a rotor is controlled using phase differences of two-phase high-frequency voltages which are applied to respective stators of the spherical actuator (for example, see Patent Document 1).

Patent Document 1: Japanese Unexamined Patent Application Publication No. 11-84526

DISCLOSURE OF THE INVENTION

Problems to be Solved by the Invention

As described above, when controlling a spherical ultrasonic motor based on phases of two-phase voltages applied to plural stators, the rotation axis of a rotor in a rotation operation can be generated with accuracy. However, when realizing a relatively low rotation speed, if phase differences of two-phase voltages to be provided to respective stators become small, there has been a problem that rotation of the rotor is not stable due to ununiformity of solid frictions between the rotor and the plural stators. Also, if phase differences become small when the rotation speed is relatively low, as described above vibrations on surfaces of the stators are close to standing-wave vibrations, and the rotor is in such a condition of floating off the stators, so that the rotor becomes vulnerable to disturbances also. In actuality, it is often the case that the spherical actuator is used at a relatively low rotation speed (rotation number), and instability of the rotation speed has been an important problem.

Figure 11:
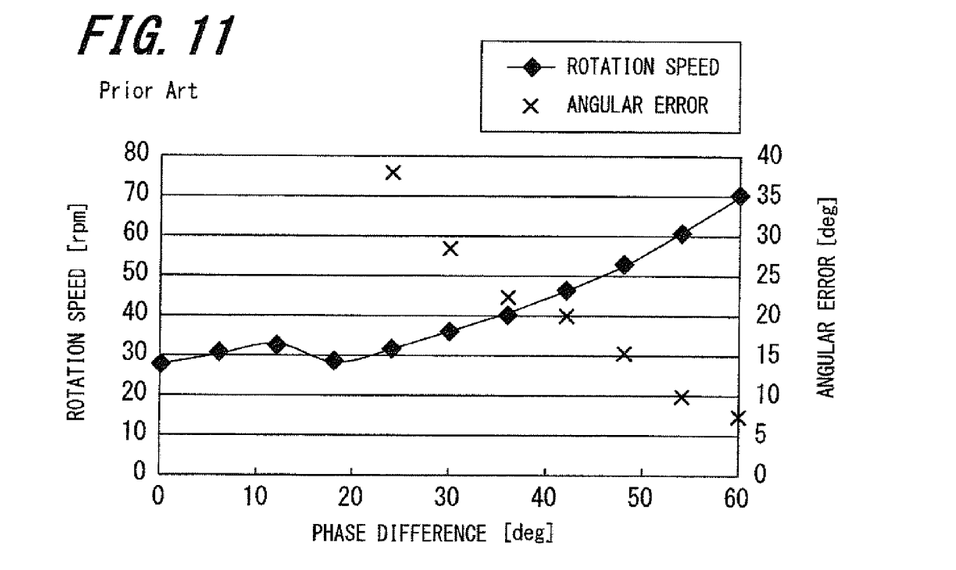
FIG. 11 is a graph for explaining a prior art.

FIG. 11 illustrates an exemplary graph showing a relationship among a phase difference (deg), a rotation speed (rpm), and an angular error (deg) when a rotor of a spherical actuator is rotated in a Y-axis direction using only phase differences of two-phase voltages applied to stators.

Here, a spherical actuator provided with three stators has been assumed, and the initial phase difference of a two-phase voltage which is applied to the first stator is 0 deg, the initial phase difference of a two-phase voltage which is applied to the second stator is +60 deg, and the initial phase difference of a two-phase voltage which is applied to the third stator is −60 deg. Then, an example is shown that phase differences of two-phase voltages applied to the first through third stators have been decreased from the initial phase differences in 10 steps, respectively, i.e., by 6 degrees each, to change the rotation speed of the rotor. That is, the phase differences shown in the horizontal axis of the graph illustrated in FIG. 11 indicate absolute values of phase differences of two-phase voltages which are applied to the second and third stators. Note that the initial phase difference of the two-phase voltage which is applied to the first stator is 0 deg, so that in this case it does not change.

As shown in FIG. 11, if phase differences of two-phase voltages which are applied to the second and third stators are decreased, the rotation speed of the rotor decreases, however, even if the phase differences become smaller than a little less than 20 deg, the rotation speed will not be zero, and the low rotation speed of the rotor becomes hard to be realized as one wishes. Also, with decreasing of the phase differences, the angular difference between a target direction of the rotation axis of the rotor and the actual direction of the rotation axis increases. That is, when it is intended to control rotation movements of the rotor only with phase differences of two-phase voltages applied to stators, if the phase differences are small, there has been a problem that the rotor cannot be rotated at a relatively low speed and that the rotation axis of the rotor does not move in an intended direction.

The present invention has been made in view of the above-described circumstance, and aims to enable a rotor having a curved-surface part such as a sphere, etc. to be controlled with high accuracy even in low-speed rotation.

Means for Solving the Problems

A spherical ultrasonic motor according to an aspect of the present invention includes: a rotor having a curved surface part; a plurality of stators which are arranged at predetermined intervals in contact with surfaces of the rotor and to which two-phase drive signals are supplied to generate ultrasonic vibrations; a plurality of oscillation units which are provided corresponding to the plurality of stators and which generate two-phase drive signals of predetermined frequencies based on inputted frequency control signals; a plurality of phase control units which are provided corresponding to the plurality of stators and which adjust phase differences of two-phase drive signals generated at the plurality of oscillation units based on inputted phase control signals; and a control unit which outputs frequency control signals for adjusting frequencies of two-phase drive signals which are supplied to the plurality of stators to target frequencies, to the plurality of oscillation units to cause the plurality of oscillation units to adjust frequencies of two-phase drive signals which are generated at the plurality of oscillation units to the target frequencies, and outputs phase control signals for adjusting phase differences of two-phase drive signals generated at the plurality of oscillation units to target phase difference, to the plurality of phase control units to cause the plurality of phase control units to adjust phase differences of two-phase drive signals generated at the plurality of oscillation units to the target phase differences. Two-phase drive signals whose frequencies have remained unchanged from initial frequencies and whose phase differences have been adjusted to target phase differences are supplied from respective phase control units of the plurality of chase control units to respective corresponding stators, and thereafter, two-phase drive signals whose phase differences have remained unchanged from initial phase differences and whose frequencies have been adjusted to target frequencies are supplied from respective phase control units of the plurality of phase control units to respective corresponding stators concurrently.

A control method for a spherical ultrasonic motor according to an aspect of the present invention includes: a first step that a control unit of the spherical ultrasonic motor determines target phase differences of two-phase drive signals to be supplied to a plurality of stators contacting surfaces of a rotor of the spherical ultrasonic motor, based on a target direction of a rotation axis of the rotor, and generates phase control signals for adjusting phase differences of the two-phase drive signals to be supplied to the plurality of stators to the target phase differences; a second step that the control unit determines target frequencies of the two-phase drive signals to be supplied to the plurality of stators, based on a target rotation speed of the rotor, and generates frequency control signals for adjusting frequencies of the two-phase drive signals to be supplied to the plurality of stators to the target frequencies; a third step of inputting respective frequency control signals generated in the second step to respective oscillation units of a plurality of oscillation units provided corresponding to the plurality of stators and configured to generate two-phase drive signals to be supplied to the plurality of stators, adjusting frequencies of the two-phase drive signals to be supplied to the plurality of stators which are generated at the plurality of oscillation units, to the target frequencies at the plurality of the oscillation units, and outputting the two-phase drive signals to be supplied to the plurality of stators, whose frequencies have been adjusted to the target frequencies, from the plurality of oscillation units; a fourth step of inputting respective phase control signals generated in the first step to respective phase control units of a plurality of phase control units provided corresponding to the plurality of stators, adjusting phase differences of the two-phase drive signals outputted from the plurality of oscillation units to the target phase differences at the plurality of phase control units, and outputting the two-phase drive signals to be supplied to the plurality of stators, whose phase differences have been adjusted to the target phase differences, from the plurality of phase control units; a fifth step of supplying two-phase drive signals whose frequencies have remained unchanged from initial frequencies and whose phase differences have been adjusted to target phase differences by the third step and the fourth step, from respective phase control units of the plurality of phase control units to respective corresponding stators; and a sixth step of supplying two-phase drive signals whose phase differences have remained unchanged from initial phase differences and whose frequencies have been adjusted to target frequencies by the third step and the fourth step, from respective phase control units of the plurality of phase control units to respective corresponding stators, concurrently, after completion of the fifth step.

In one aspect of the present invention, in controlling rotation motions of a spherical ultrasonic motor, by setting the direction of a rotation axis of the spherical ultrasonic motor by determining phase differences of drive signals which are applied to a plurality of stators while maintaining frequencies thereof unchanged, the direction of the rotation axis can be determined with accuracy. Further, even in a low speed rotation, stable control is possible by controlling the rotation speed of the spherical ultrasonic motor by uniformly adjusting frequencies of drive signals which are applied to the plurality of stators while maintaining phase differences thereof unchanged.

Effects of the Invention

According to the present invention, a rotor having a curved-surface part such as a sphere, etc. can be controlled with accuracy even in low-speed rotation.

BEST MODE FOR CARRYING OUT THE INVENTION

Below, description will be made, referring to FIG. 1 through FIG. 10, with respect to a spherical ultrasonic motor according to an embodiment of the present invention. Note that common parts in respective drawings are denoted by the same reference symbols. The present invention is not limited to the following embodiment.

[Exemplary Constitution of Spherical Actuator]

Figure 1:
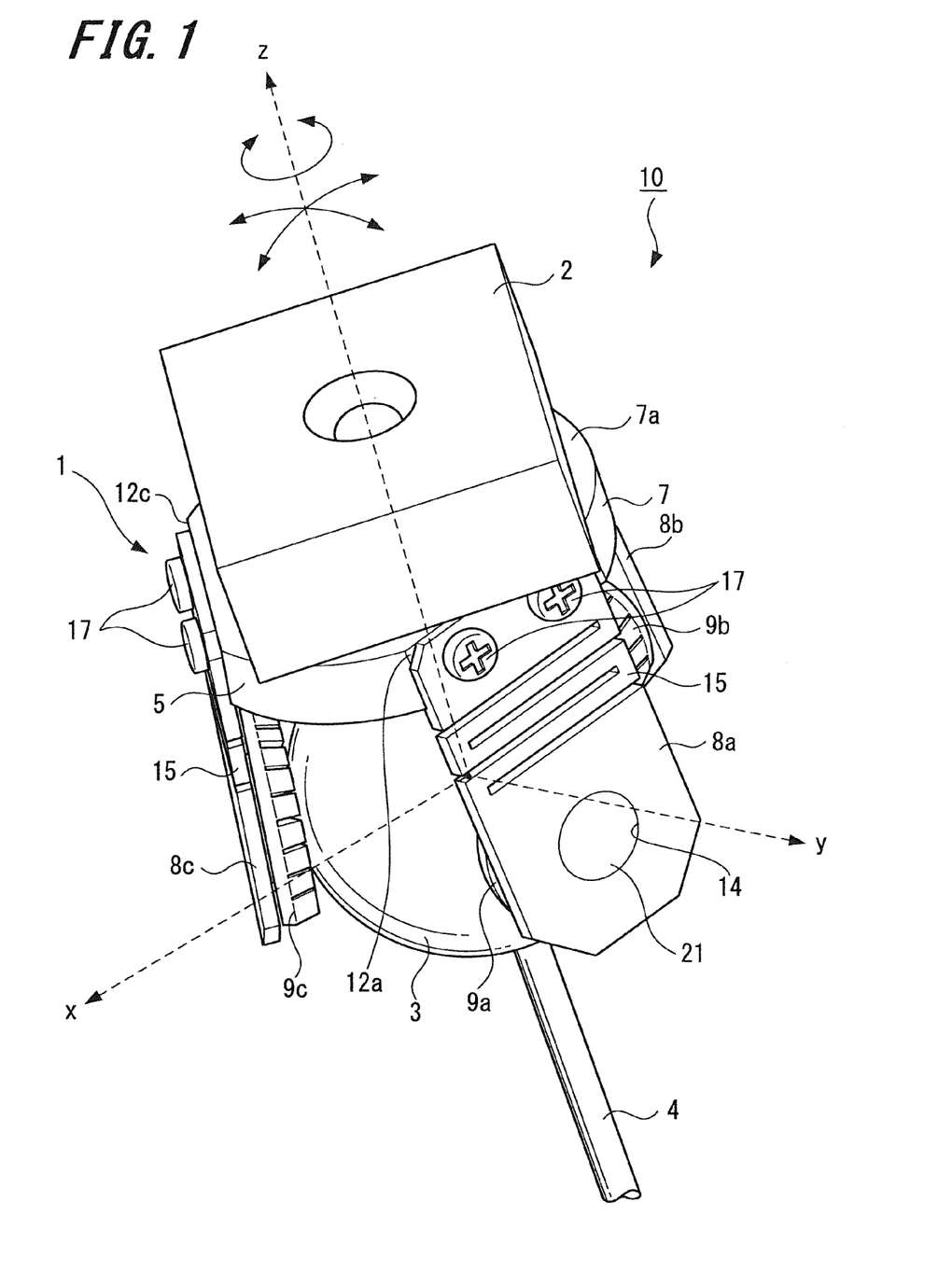
FIG. 1 is a perspective view illustrating an image pickup apparatus viewed from the front side, the image pickup device provided with a spherical actuator according to an embodiment of the present invention.
Figure 2:
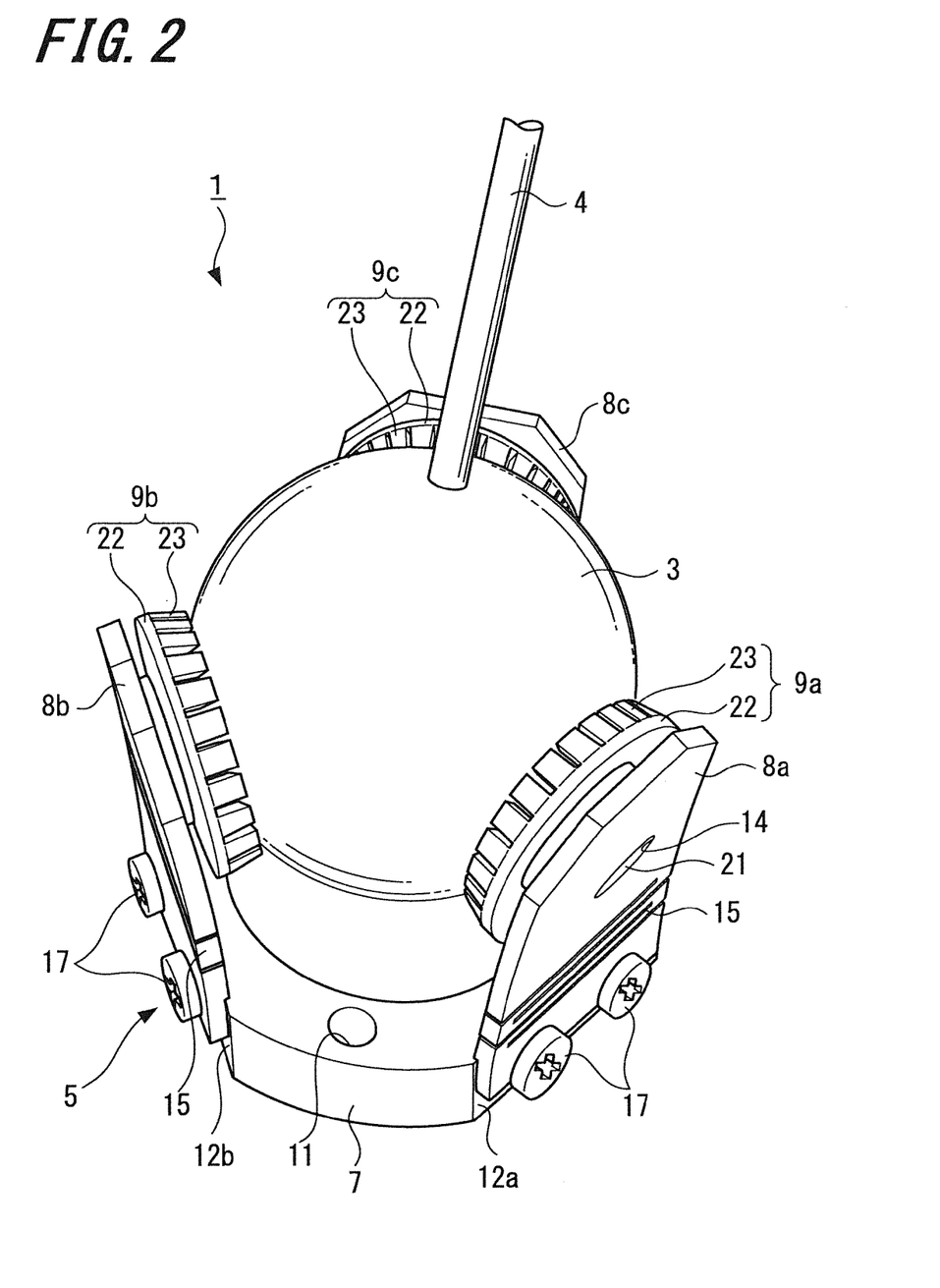
FIG. 2 is a perspective view illustrating a spherical actuator according to an embodiment of the present invention, viewed from the back side.

FIG. 1 is a perspective view illustrating an image pickup apparatus viewed from the front side, the image pickup apparatus provided with a spherical actuator to which a spherical ultrasonic motor of the present invention has been applied, and FIG. 2 is a perspective view illustrating the spherical actuator viewed from the back side.

An image pickup apparatus 10 as an embodiment of the present invention (hereinafter called "present embodiment") illustrated in FIG. 1 includes a spherical actuator 1 according to an embodiment of the present invention, and an image pickup unit 2 as a concrete example of a rotated member. The image pickup unit 2 includes an image pickup device (for example, a CCD (charge-coupled device), a CMOS (complementary metal-oxide semiconductor), etc.), and a lens unit which causes an image light from an imaging object to be incident to the image pickup device.

The spherical actuator 1 shown in FIG. 1 and FIG. 2 is an actuator having degrees of freedoms in multiple directions (in the present embodiment, in three axial directions, an x-axis direction, a y-axis direction, and a z-axis direction, which are perpendicular to one another). The spherical actuator 1 includes a substantially spherical support member 3 (rotor), a fixing member 4 which fixes the support member 3, and a movable member 5 which is rotatably supported by the support member 3. The image pickup unit 2 is attached to the movable member 5.

The support member 3 (rotor) is formed substantially spherically, and has a curved-surface part. The fixing member 4 which is cylindrically shaped is attached to the support member 3. The support member 3 is fixed by the fixing member 4 so as not to rotate. The movable member 5 is rotatably supported by the support member 3 fixed to the fixing member 4. Note that in the present embodiment, the shape of the support member 3 has been described as substantially spherical, however, the shape of the support member 3 is not limited to this, and for example, the support member 3 may be formed in various other shapes each having an outwardly bulging curved-surface part, such as hemispherical, oval, disk-like shapes, etc. Further, although the fixing member 4 has been described as having a cylindrical shape, it is needless to say that the fixing member 4 may be formed in a shape of a rectangular cylinder and in various other kinds of shapes of a rod.

Figure 3:
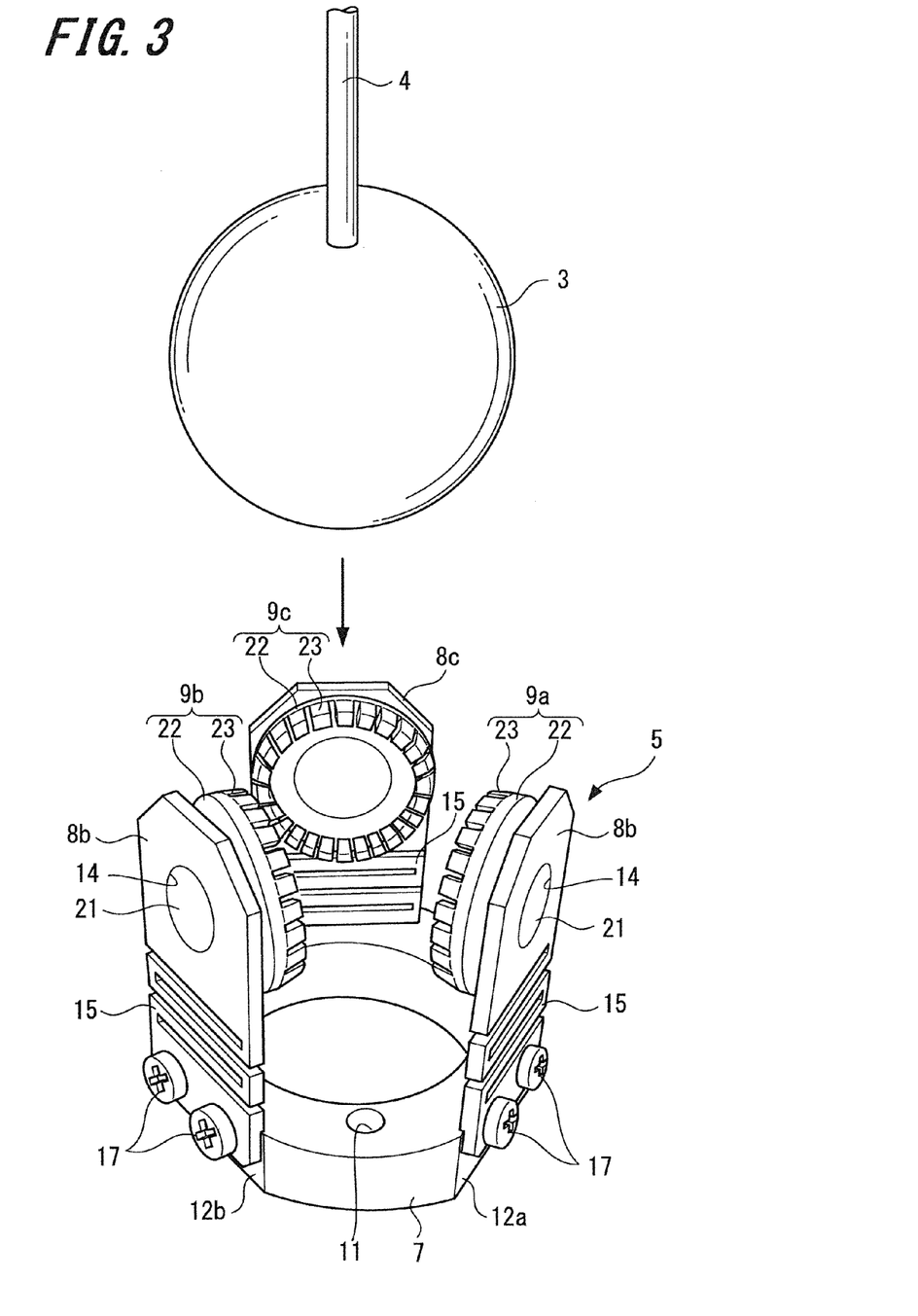
FIG. 3 is an exploded perspective view illustrating a spherical actuator according to an embodiment of the present invention.

FIG. 3 is an exploded perspective view illustrating a spherical actuator of the present embodiment.

As illustrated in FIG. 3, the movable member 5 includes a pedestal unit 7 which is substantially annular, three arm units 8a, 8b, 8c arranged to the pedestal unit 7 at substantially equiangular intervals, three driving force generation units 9a, 9b, 9c (stators) which are fixed to the arm units 8a, 8b, 8c, respectively. The pedestal unit 7 is substantially annular, and is provided with a mounting hole 11 for fixing the image pickup unit 2. The end face of the pedestal unit 7 is flat and constitutes a mounting surface 7a to which the image pickup unit 2 is mounted (see FIG. 1). In the pedestal unit 7, three fixing surfaces 12a, 12b, 12c are formed by cutting the outer circumference flat at substantially equiangular intervals (in the present embodiment, 120°). The three arm units 8a, 8b, 8c are fixed to the three fixing surfaces 12a, 12b, 12c, respectively, so as to extend to the opposite side of the mounting side of the image pickup unit 2 of the pedestal unit 7. The interval between adjacent arm units of the three arm units 8a, 8b, 8c is set broader than the shaft diameter of the fixing member 4.

The first driving force generation unit 9a is attached to the first arm unit 8a of the three arm units 8a, 8b, 8c, and the second driving force generation unit 9b is attached to the second arm unit 8b, and the third driving force generation unit 9c is attached to the third arm unit 8c. These three arm units 8a, 8b, 8c have the same constitution, so that description will be made here with respect to the first arm unit 8a.

The first arm unit 8a is formed in a shape of a substantially rectangular flat plate, and corners thereof are cut. The first arm unit 8a has a fixing hole (not shown in figure) for fixing the first arm unit 8a to the first fixing surface 12a of the pedestal unit 7, an opening 14 to which the first driving force generation unit 9a is mounted, and an elastic part 15. The fixing hole not illustrated in figure is provided at one end part in the longitudinal direction of the first arm unit 8a. The first arm unit 8a is fixed to the first fixing surface 12a of the pedestal unit 7 by screwing a fixing screw in the fixing hole. The second and third arm units 8b, 8c are fixed to the second and third fixing surfaces 12b, 12c of the pedestal unit 7, respectively.

The opening 14 is provided on the other end side in the longitudinal direction of the first arm unit 8a, which is on the opposite side of the fixing hole. A later described fixing part 21 of the first driving force generation unit 9a is engaged with the opening 14. Fixing parts 21 of the second and third driving force generation units 9b, 9c are engaged with openings 14 of the second and third arm units 8b, 8c, respectively. The elastic part 15 is provided substantially at a center in the longitudinal direction of the first arm unit 8a. The elastic part 15 is formed by cutting out the first arm unit 8a, along a transverse direction, from outer edges, alternately, at plural places, with predetermined intervals opened in the longitudinal direction. The driving force generation unit 9a is biased toward the support member 3 by the elastic part 15.

Note that in the present embodiment, the three arm units 8a, 8b, 8c and the pedestal unit 7 have been described as separate members, however, the present invention is not limited to this, and the three arm units 8a, 8b, 8c and the pedestal unit 7 may be integrally formed as one member.

Figure 4A:
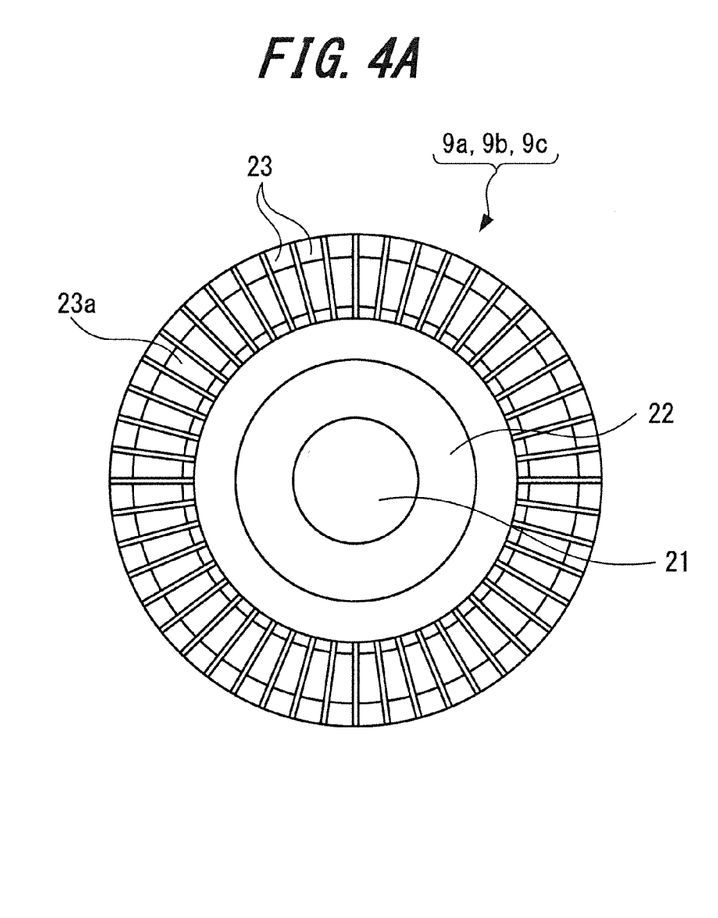
FIG. 4A is a front view and FIG. 4B is a cross-section view respectively illustrating a driving force generation unit of a spherical actuator according to an embodiment of the present invention.

Next, referring to FIG. 4A and FIG. 4B, description will be made with respect to the driving force generation units 9a, 9b, 9c (stators). Because the three driving force generation units 9a, 9b, 9c have substantially the same constitution, description will be made here with respect to the first driving force generation unit 9a. FIG. 4A is a front view illustrating a driving force generation unit, and FIG. 4B is a cross-section view illustrating the driving force generation unit.

Figure 4B:
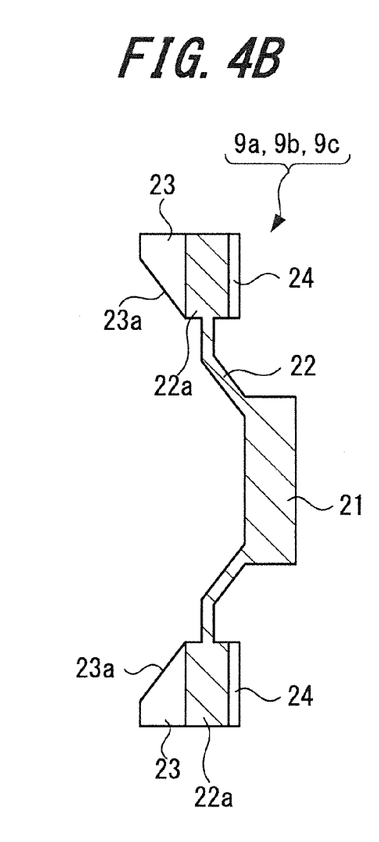

As illustrated in FIG. 4A and FIG. 4B, the first driving force generation unit 9a includes the fixing part 21 which is engaged with the opening 14 of the first arm unit 8a, a support body 22 formed in a thin dish-like shape, a plurality of contact pieces 23 which are annularly arranged, and a piezoelectric element 24 which is a vibration element. The fixing part 21 is formed in a substantially disk-like shape having a diameter that is substantially equal to that of the opening 14 of the first arm unit 8a. The support body 22 is continuously formed from the outer circumference of the fixing part 21. The support body 22 is formed in a thin dish-like shape, and has an annular flat part 22a on the outer circumference thereof. The plurality of contact pieces 23 are formed in the annular flat part 22a.

The plurality of contact pieces 23 protrude from the flat part 22a of the support body 22 in the same direction annularly at constant intervals. A round surface 23a is provided in each of the plurality of contact pieces 23, the round surface 23a having the same curvature as the surface curvature of the support member 3 so as to correspond to the curved surface of the support member 3. The piezoelectric element 24, which vibrates the plurality of contact pieces 23, is attached to the surface of the flat part 22a of the support body 22 opposite to the surface where the plurality of contact pieces 23 have been provided, by a fixing method such as an adhesive, etc.

The piezoelectric element 24 is electrically connected with a not-shown piezoelectric element driving source through not-shown flexible wiring. If an AC voltage in an ultrasonic wave range is applied to the piezoelectric element 24 from the piezoelectric element driving source, micro vibrations (ultrasonic vibrations) are generated in the piezoelectric element 24 due to an electrostrictive phenomenon of the piezoelectric element 24. The micro vibrations generated in the piezoelectric element 24 are transferred to the plurality of contact pieces 23 via the flat part 22a of the support body 22. Thereby, the plurality of contact pieces 23 is vibrated, and surface-wave vibrations such as flexural vibrations, stretching vibrations, etc. are generated on surfaces of the contact pieces 23.

Note that in the present embodiment, an example that the piezoelectric element 24 is attached to the flat part 22a of the support body 22 by an adhesive has been described, however, the attaching method of the piezoelectric element 24 is not limited to this. For example, a piezoelectric film may be directly formed on the flat part 22a of the support body 22, or a piezoelectric material may be directly coated on the flat part 22a of the support body 22. According to these methods, it can be prevented or suppressed that the attachment surfaces of the piezoelectric element 24 and the support body 22 are deteriorated.

Figure 5:
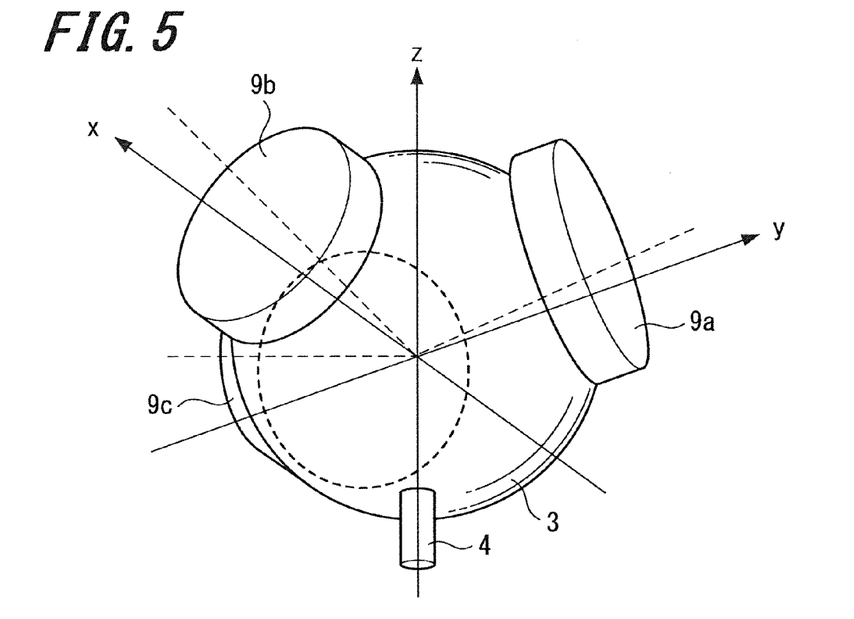
FIG. 5 is an explanatory diagram illustrating a positional relationship of driving force generation units to a support member of a spherical actuator according to an embodiment of the present invention.

FIG. 5 is an explanatory diagram illustrating a positional relationship of the three driving force generation units 9a, 9b, 9c and the support member 3.

As illustrated in FIG. 5, the three driving force generation units 9a, 9b, 9c are arranged, centering on the support member 3, at angular intervals of 120° around the z-axis direction (axial direction of the fixing member 4 passing the center of the support member 3). Further, for rotating the movable member around the z-axis direction, the three driving force generation units 9a, 9b, 9c are arranged in positions on the opposite side of the fixing member 4 in the z-axis direction from the x-y plane passing the center of the support member 3.

[Operation of Spherical Actuator]

Next, description will be made with respect to the operation of the spherical actuator 1 of the present embodiment.

First, if a voltage is applied to the piezoelectric element 24 of each driving force generation unit from the not shown piezoelectric element driving source (later described drive signal generation unit), micro vibrations are generated in the piezoelectric element 24 due to the electrostrictive phenomenon of the piezoelectric element 24. The generated micro vibrations are transmitted to the plurality of contact pieces 23, and the plurality of contact pieces 23 resonate. Here, surface-wave vibrations such as flexural vibrations, stretching vibrations, etc. are generated on surfaces of the plurality of contact pieces 23. At this time, antinodes and nodes of vibrations are generated in specific positions in the row of the annularly arranged plurality of contact pieces 23. And, by adjusting the voltage to be applied to the piezoelectric element 24, the positions of antinodes and nodes of vibrations generated in the row of the plurality of contact pieces 23 are moved one after another. As a result, travelling waves travelling in a circumferential direction in the row of the plurality of contact pieces 23 are generated.

Further, as illustrated in FIG. 1 and FIG. 2, the plurality of contact pieces 23 contact surfaces of the support member 3. Therefore, the travelling waves generated in the plurality of contact pieces 23 and traveling in the circumferential direction are transmitted to the support member 3 by frictional forces. Here, the support member 3 is fixed by the fixing member 4, and cannot be rotated. Therefore, the movable member 5 including the three driving force generation units 9a, 9b, 9c is rotated, while sliding over the surface of the support member 3.

Figure 6:
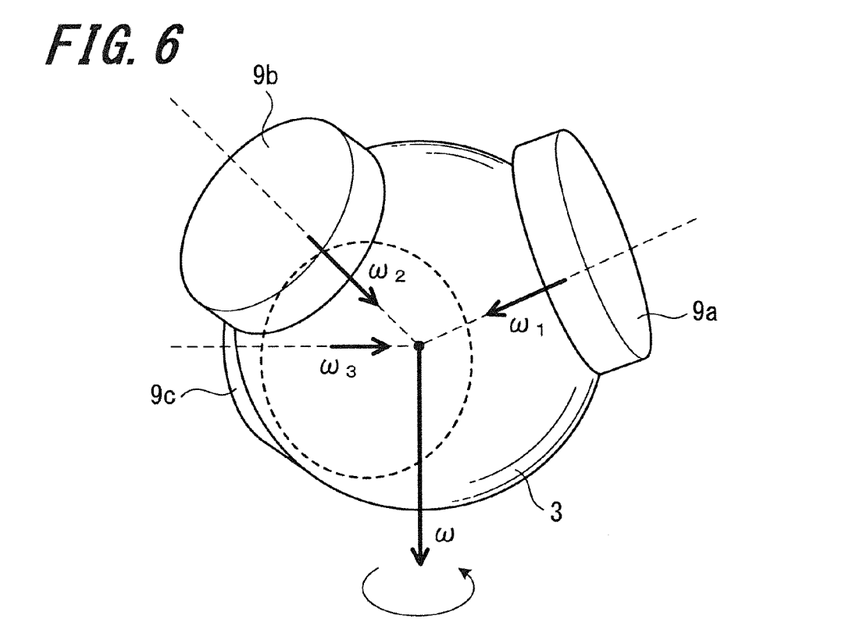
FIG. 6 is an explanatory diagram illustrating an example of angular velocity vectors of a spherical actuator of the present invention.

FIG. 6 is a diagram illustrating angular velocity vectors of the three driving force generation units 9a, 9b, 9c and an angular velocity vector of the support member 3.

Directions of arrows of respective vectors express directions of rotation axes of rotational movements based on driving forces generated by respective driving force generation units, and lengths of respective vectors express sizes of angular velocities (rotation torques) of rotational movements. The three driving force generation units 9a, 9b, 9c generate rotation torques indicated by angular velocity vectors $\omega_1$, $\omega_2$, $\omega_3$, respectively, and a rotation torque, whose rotational axis is the direction of a resultant vector $\omega$ of the three angular velocity vectors $\omega_1$, $\omega_2$, $\omega_3$, acts on the support member 3. As a result, the movable member 5 having the three driving force generation units 9a, 9b, 9c, which constitutes the spherical actuator 1, rotates while sliding over the surface of the support member 3 fixed to the fixing member 4. Note that it is conceivable that depending on directions and sizes of the three angular velocity vectors $\omega_1$, $\omega_2$, $\omega_3$, a plurality of combinations is conceivable even when the resultant vector $\omega$ of the three angular velocity vectors $\omega_1$, $\omega_2$, $\omega_3$ is the same.

The present invention is characterized in that voltages (drive signals) to be applied to respective driving force generation units are controlled in two steps (hereinafter, referred to as "hybrid control" also) in order to enable controlling the movable member 5 to which the image pickup unit 2 has been attached with high accuracy in a relatively low speed rotation. Whatever the rotation speed of the movable member 5 may be, if the frictional force between the support member 3 and each of the driving force generation units is not constant, the movable member 5 will not be rotated with accuracy. Therefore, in the present invention, the direction of the rotation axis of the movable member 5 is first determined by determining phases of voltages which are applied to the three driving force generation units 9a, 9b, 9c, and then rotation speed of the movable member 5 is controlled by adjusting frequencies of the voltages applied to the three driving force generation units 9a, 9b, 9c, respectively.

Figure 7:
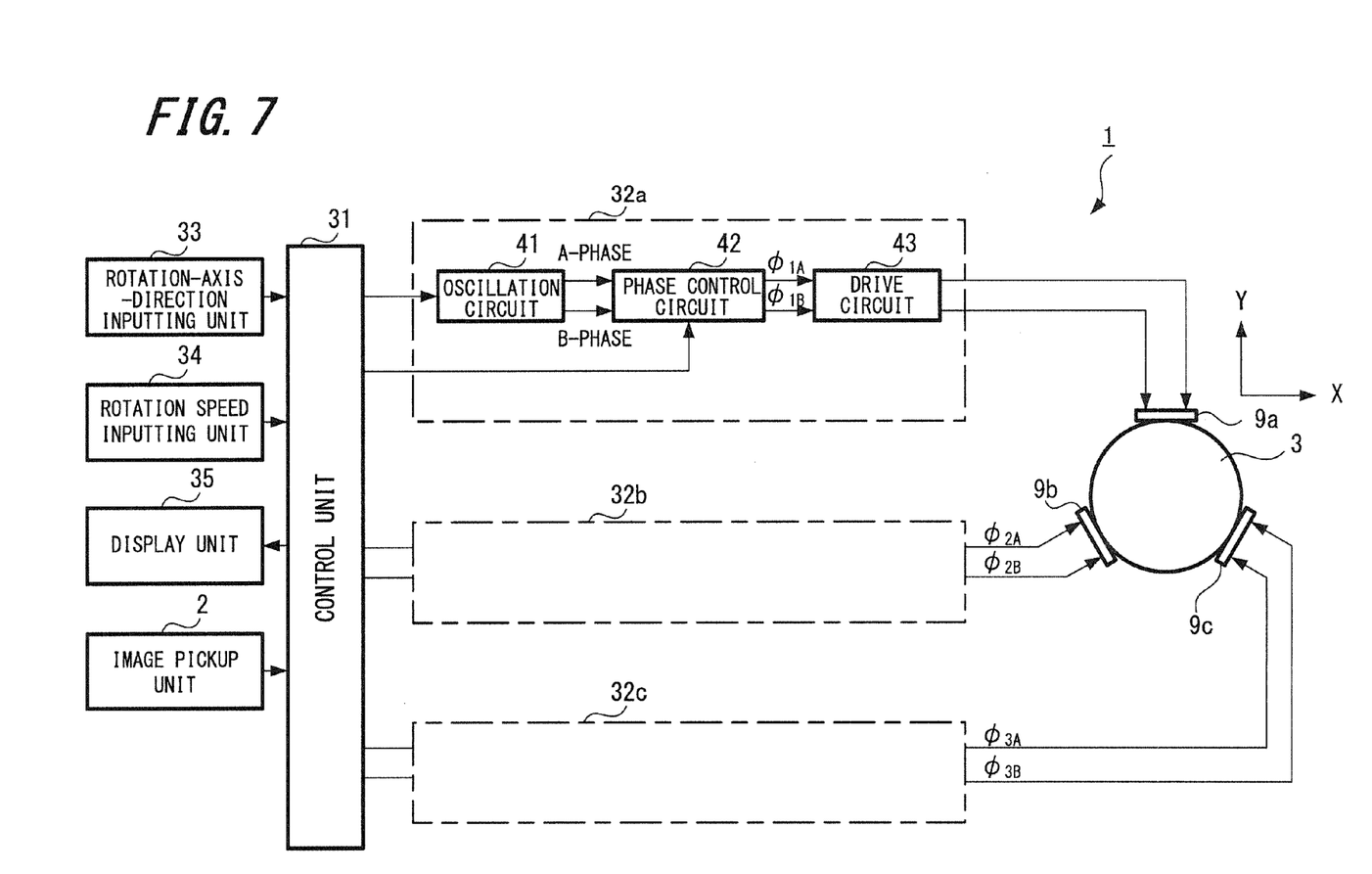
FIG. 7 is a block diagram illustrating a control mechanism of a spherical actuator according to an embodiment of the present invention.

FIG. 7 illustrates an exemplary constitution of a control mechanism of the spherical actuator 1 for realizing the above-described two-step control method.

In the present embodiment, for controlling the spherical actuator 1 constituted by the support member 3 and the movable member 5 having the three driving force generation units 9a, 9b, 9c, the spherical actuator 1 includes a control unit 31, three drive signal generation units 32a, 32b, 32c, a rotation-axis-direction inputting unit 33, and a rotation speed inputting unit 34.

The control unit 31 is constituted, for example, by a microcomputer, and based on instructions, etc. of the user through the rotation-axis-direction inputting unit 33 and the rotation speed inputting unit 34, calculates target phase differences and target frequencies of two-phase (A-phase and B-phase) voltages which are applied to the three driving force generation units 9a, 9b, 9c, respectively. The control unit 31 then supplies phase control signals and frequency control signals, including the calculation results, to the drive signal generation units 32a, 32b, 32c.

The three drive signal generation units 32a, 32b, 32c generate voltages (drive signals) to be applied to the corresponding driving force generation units 9a, 9b, 9c, respectively, based on the above-described calculation results at the control unit 31. Because the three drive signal generation units 32a, 32b, 32c have the same constitution, description will be made here with respect to the first drive signal generation unit 32a.

The first drive signal generation unit 32a includes an oscillation circuit 41, a phase control circuit 42, and a drive circuit 43.

The oscillation circuit 41 generates a two-phase drive signal which is an AC signal of a predetermined oscillation frequency, based on a frequency control signal which is inputted from the control unit 31, and outputs the two-phase drive signal to the phase control circuit 42.

The phase control circuit 42 is a so-called phase shifter, and based on a phase control signal carrying phase-difference information, which is inputted from the control unit 31, changes a phase $\phi_{1A}$ of an A-phase drive signal and a phase $\phi_{1B}$ of a B-phase drive signal of the two-phase drive signal inputted from the oscillation unit 41 to thereby adjust a phase difference ($\phi_{1A}$-$\phi_{1B}$) of the A-phase drive signal and the B-phase drive signal, and outputs the A-phase and B-phase signals whose phase difference has been adjusted, to the drive circuit 43.

The drive circuit 43 amplifies the A-phase and B-phase drive signals from the phase control circuit 42 and applies the amplified drive signals to the first driving force generation unit 9a. The first driving force generation unit 9a to which the drive signals have been applied generates surface wave vibrations corresponding to the phase difference and frequencies of the applied A-phase and B-phase drive signals.

Note that the constitution of the drive signal generation units 32a, 32b, 32c has been invented by the present applicant, however, if the oscillation circuit 41, the phase control circuit 42, and the drive circuit 43 are treated as standalone devices, respectively, they are known devices. That is, the constitution of the drive signal generation units 32a, 32b, 32c is not limited to the example illustrated in FIG. 7 so long as the above-described functions of the present invention are satisfied by combining known blocks. For example, in the present embodiment, the oscillation circuit 41 generates A-phase and B-phase drive signals, however, it may be configured such that the oscillation circuit 41 generates a drive signal of only one phase and the phase control circuit 42 generates a two-phase drive signal having a predetermined phase difference.

Now, description returns to the constitution of the spherical actuator 1.

The rotation-axis-direction inputting unit 33 generates an input signal in response to the operation thereof by the user and inputs the generated signal to the control unit 31. The user can set the rotation axis of the movable member 5 to which the image pickup unit 2 has been attached, in a desired direction, by operating the rotation-axis-direction inputting unit 33.

The rotation speed inputting unit 34 generates an input signal in response to the operation thereof by the user and inputs the generated signal to the control unit 31. The user can adjust the rotation speed of the movable member 5 to which the image pickup unit 2 has been attached, to a desired rotation speed, by operating the rotation speed inputting unit 34.

Key switches, jog dials, etc. may be used for the rotation-axis-direction inputting unit 33 and the rotation speed inputting unit 34.

Further, the image pickup unit 2 and a display unit 35 are connected with the control unit 31, and after images taken by the image pickup unit 2 have been subjected to image processing at the control unit 31, the processed images are displayed in the display unit 35. The user controls the operation of the image pickup unit 2 by operating the rotation-axis-direction inputting unit 33 and the rotation speed inputting unit 34 while confirming images displayed in the display unit 35, and thereby the user can obtain desired images. A liquid crystal display device, etc., for example, can be applied to the display unit 35.

Note that it may be configured such that rotation of the movable member 5 is detected by attaching a not-shown rotation sensor to the spherical actuator 1 and connecting an output terminal of the rotation sensor to the control unit 31. For example, the rotation sensor is constituted by a light emitting device (not shown in figure) and a light receiving device (not shown in figure). The light emitting device and the light receiving device are arranged such that light emitted from the light emitting device and reflected by a circular reflection seal (not shown in figure) attached to the upper surface of the movable member 5 is received by the light receiving device, and a pulse signal with a pulse cycle corresponding to the rotation speed of the movable member 5 is detected by the rotation sensor.

For the communication device for communicating drive signals between respective blocks illustrated in FIG. 7, various communication devices may be used, such as a USB (Universal Serial Bus), a serial bus, etc. Further, communication between the control unit 31 and each of the rotation-axis-direction inputting unit 33, the rotation speed inputting unit 34, and the three drive signal generation units 32a, 32b, 32c may be carried out wirelessly.

Further, it may be configured such that actual vibrations of the driving force generation units 9a, 9b, 9c are detected by vibration detection units (not shown in figure), respectively, and phase differences between signals indicating the detected vibrations and A-phase or B-phase drive signals of 2-phase drive signals applied to the driving force generation units 9a, 9b, 9c are measured. In this case, the spherical actuator 1 can be more stably controlled by controlling phase differences (frequencies are fixed) and frequencies (phase differences are fixed) of the two-phase drive signals applied to the driving force generation units 9a, 9b, 9c such that the measured phase differences become desired values.

Further, the control unit 31 may be configured to automatically detect the current position of the rotation axis and/or rotation speed of the movable member 5 of the spherical actuator 1 using images taken by the image pickup unit 2, information obtained by rotation sensors, and comparison information of drive signals and actual vibrations. In this case, the control unit 31 generates phase control signals and frequency control signals for realizing a target rotation-axis-direction and a target rotation speed, and inputs the generated signals to the phase control circuits 42 and the oscillation circuits 41, respectively.

Figure 8:
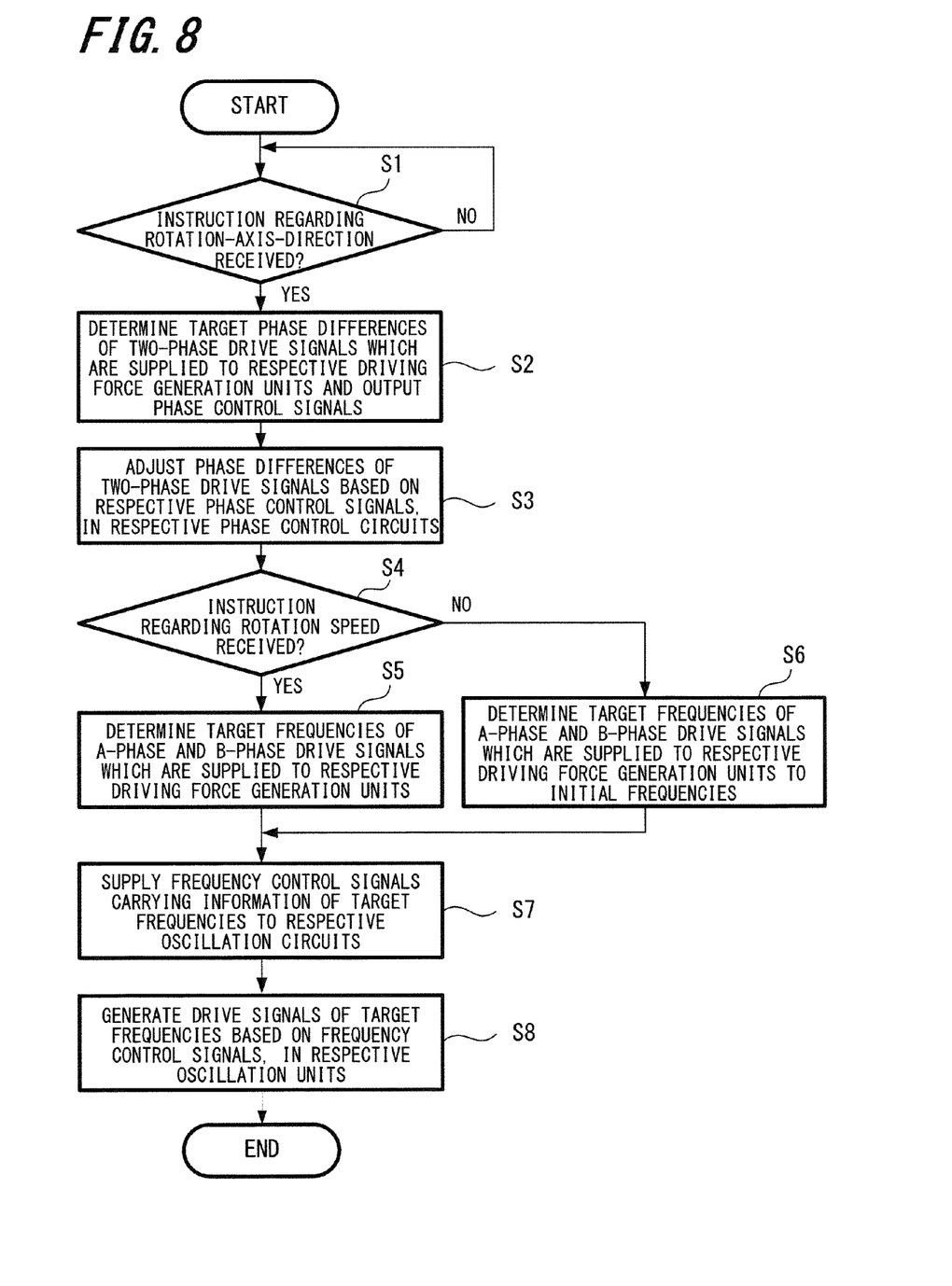
FIG. 8 is a flowchart illustrating a control method of a spherical actuator of the present invention.

Next, a concrete example of the control method of the spherical actuator 1 based on the control mechanism of FIG. 7 is described referring to a flowchart of FIG. 8.

First, in step S1, the control unit 31 determines whether or not an instruction has been given by the user regarding the direction of the rotation axis of the movable member 5 to which the image pickup unit 2 has been attached, that is, whether or not an input signal has been inputted from the rotation-axis-direction inputting unit 33. After completion of this determination processing, it is proceeded to step S2.

When it is determined in the above-described determination processing of step S1 as that the direction of the rotation axis has been instructed, in step S2, the control unit 31 determines target phase differences of A-phase and B-phase drive signals which are supplied to the three driving force generation units 9a, 9b, 9c of the movable member 5, respectively, according to the instructed direction of the rotation axis, and supplies phase control signals carrying information of the determined target phase differences to respective phase control circuits 42 of the three drive signal generation units 32a, 32b, 32c. After completion of the above-described processing, it is proceeded to step S3.

Note that when determining the above-described target phase differences, the rotation speed of the movable member 5 is ignored, and it is focused only on generation of the direction of the rotation axis. That is, the phase differences of two-phase voltages (drive signals), which are applied to the driving force generation units 9a, 9b, 9c, are set, not at 10°, 20°, 30°, but, for example, at 30°, 60°, 90°. The reason is that as described above, if phase differences of respective two-phase drive signals are small (for example, 20° or below), it is difficult to determine the direction of the rotation axis. Therefore, the phase difference of a two-phase drive signal to be applied to either one of the three driving force generation units 9a, 9b, 9c is set, for example, at 60° or above, with which a relatively large traveling wave can be obtained. Thus, by using a relatively large phase difference, the direction of the rotation axis of the movable member 5 can be determined in a stable manner. Also, because surface wave vibrations whose traveling wave components are relatively large are generated in the three driving force generation units 9a, 9b, 9c, the applied voltages can be efficiently converted to rotation movements.

In step S3, the phase control circuits 42 of the three driving signal generation units 32a, 32b, 32c change (adjust) phase differences of A-phase and B-phase drive signals outputted from the oscillation circuits 41 from initial phase differences to target phase differences determined by the control unit 31, based on respective phase control signals inputted from the control unit 31. At this time, frequencies of the drive signals are constant (remain unchanged from initial frequencies), respectively. Then, A-phase and B-phase signals whose phase differences have been changed (adjusted), respectively, are outputted to respective drive circuits 43. The A-phase and B-phase drive signals whose phase differences have been changed (adjusted) and which have been outputted from the phase control circuits 42, respectively, are amplified by respective drive circuits 43, and supplied to respective corresponding driving force generation units 9a, 9b, 9c. In the three driving force generation units 9a, 9b, 9c, to which A-phase and B-phase drive signals whose phase differences have been changed (adjusted) have been applied from respective drive circuits 43, respectively, surface wave vibrations are generated based on the phase differences of the A-phase and B-phase drive signals after having been changed, and the rotation axis based on the surface wave vibrations is generated in the movable member 5 (the rotation axis is moved). After completion of this processing, it is proceeded to step S4.

On the other hand, in step S4, the control unit 31 determines whether or not an instruction has been given by the user regarding the rotation speed of the movable member 5 to which the image pickup unit 2 has been attached, that is, whether or not an input signal has been inputted from the rotation speed inputting unit 34. In response to a result of this determination, it is proceeded to step S5 or S6.

When it is determined in determination processing in step S4 as that an instruction regarding the rotation speed has been given, in step S5, the control unit 31 determines target frequencies of A-phase and B-phase drive signals which are supplied to the three driving force generation units 9a, 9b, 9c of the movable member 5, in accordance with the instructed rotation speed. After completion of this processing, it is proceeded to step S7.

On the other hand, when it is determined in determination processing in step S4 as that an instruction regarding the rotation speed has not been given, in step 6, the control unit 31 determines target frequencies of A-phase and B-phase drive signals which are supplied to the three driving force generation units 9a, 9b, 9c of the movable member 5 to preliminarily registered initial frequencies. The information of the initial frequencies of A-phase and B-phase drive signals which are supplied to the three driving force generation units 9a, 9b, 9c are stored in a nonvolatile memory device, etc., such as an internal memory, etc., of the control unit 31 (microcomputer). After completion of this processing, it is proceeded to step S7.

Then, in step S7, frequency control signals carrying information of the target frequencies determined in step S5 or S6 are supplied to respective oscillation circuits 41 of the three drive signal generation units 32a, 32b, 32c. After completion of this processing, it is proceeded to step S8.

In step S8, respective oscillation circuits 41 of the three drive signal generation units 32a, 32b, 32c generate A-phase and B-phase drive signals of predetermined frequencies (i.e., target frequencies) based on respective frequency control signals inputted from the control unit 31, and output the A-phase and B-phase drive signals of target frequencies to respective phase control circuits 42. At this time, phase differences of the A-phase and B-phase drive signals are constant (remain unchanged from initial phase differences). Then, the A-phase and B-phase drive signals of target frequencies (phase differences remaining unchanged from initial phase differences) are supplied from the phase control circuits 42 to respective drive circuits 43, subjected to predetermined amplification processing, and then supplied to the three driving force generation units 9a, 9b, 9c, respectively. The three driving force generation units 9a, 9b, 9c generate surface wave vibrations based on the target frequencies of the A-phase and B-phase signals, and thereby the movable member 5 capable of rotating with respect to the fixed support member 3 performs rotation motions based on the surface wave vibrations. After completion of this processing, a series of processing ends. If an instruction is made again to the movable member 5 to perform rotation motions, processing of step S1 through step S8 is repeated.

Note that the important point for adjusting the movable member 5 to a target rotation speed by adjusting frequencies of drive signals which are supplied to respective driving force generation units 9a, 9b, 9c to target frequencies in the above-described step S8 is to change frequencies of drive signals which are applied to respective driving force generation units 9a, 9b, 9c uniformly and apply the drive signals whose frequencies have been changed uniformly to the three driving force generation units 9a, 9b, 9c concurrently. If resonance frequencies of the three driving force generation units 9a, 9b, 9c are, for example, 30 kHz, frequencies of drive signals which are applied to the driving force generation units 9a, 9b, 9c are changed together, for example, to 30.5 kHz or 31 kHz. By changing all of the frequencies of drive signals which are applied to the three driving force generation units 9a, 9b, 9c uniformly, the output ratio of the three driving force generation units 9a, 9b, 9c does not change, and only respective output sizes change.

Figure 9:
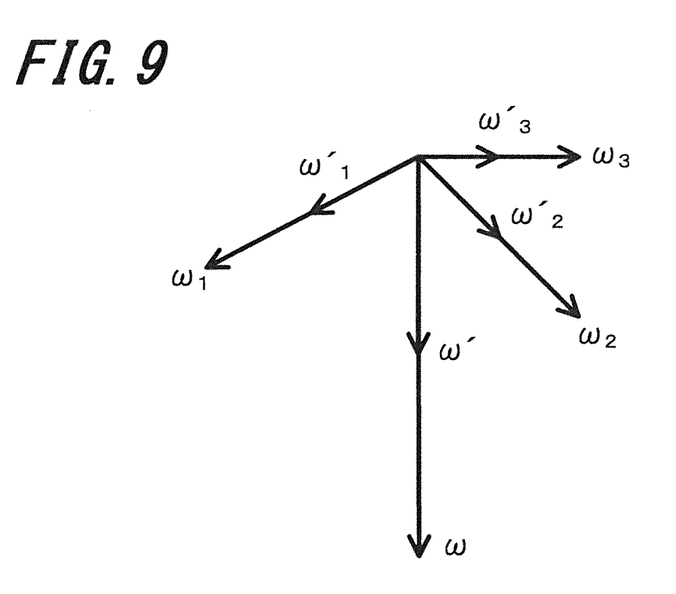
FIG. 9 is an explanatory diagram illustrating a frequency control of a spherical actuator of the present invention.

FIG. 9 illustrates an example in which frequencies of drive signals which are applied to the first driving force generation unit 9a, the second driving force generation unit 9b, and the third driving force generation unit 9c, illustrated in FIG. 6, are changed to halves of initial frequencies, respectively. The angular velocity vector $\omega_1$ of the first driving force generation unit 9a, the angular velocity vector $\omega_2$ of the second driving force generation unit 9b, and the angular velocity vector $\omega_3$ of the third driving force generation unit 9c are changed to angular velocity vectors $\omega_1'$, $\omega_2'$, $\omega_3'$ which are halves of the initial angular velocity vectors $\omega_1$, $\omega_2$, $\omega_3$, respectively, and as a result, the direction of a resultant vector $\omega'(=\omega_1'+\omega_2'+\omega_3')$ remains as it is and the size thereof is changed to the half. Thus, in order to control the rotation speed without changing the direction of the rotation axis of the movable member 5 (the direction of the resultant vector), it is vital to change frequencies of drive signals which are applied to respective driving force generation units uniformly.

As in the spherical actuator 1 according to the present embodiment, by controlling drive signals which are applied to respective driving force generation units in two steps by phase differences and frequencies, the rotation axis of the movable member 5 which rotates with respect to the fixed support member 3 is stabilized, and the rotation speed thereof can be smoothly changed also. That is, even in a relatively low speed rotation, the direction of the rotation axis of the movable member 5 which rotates around the support member 3 can be secured with accuracy, precision of rotation control is improved, and the movable member 5 can be driven in an intended direction. Even if it is tried from the first to realize highly accurate control of the direction of the rotation axis and the rotation speed of the movable member 5 by changing only frequencies of drive signals which are applied to respective driving force generation units, it cannot be realized in a stable manner. Highly accurate control of the direction of the rotation axis and the rotation speed of the movable member 5 can be realized only by using two control parameters, phase differences and frequencies of drive signals to be applied to respective driving force generation units.

Figure 10:
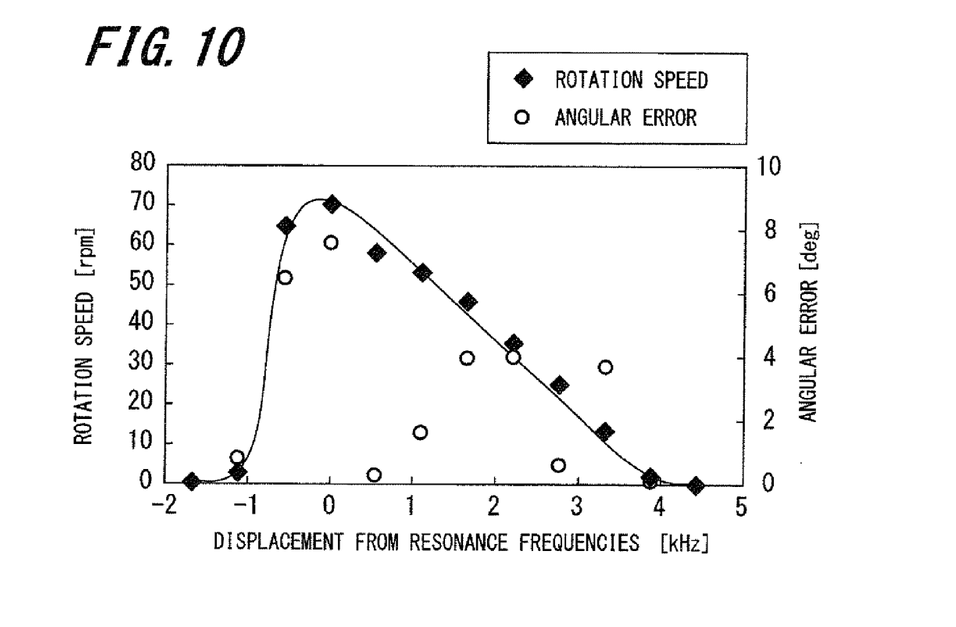
FIG. 10 is a graph showing a measurement result of a spherical actuator of the present invention.

FIG. 10 illustrates an exemplary graph showing a relationship of displacement (displacement amounts) from resonance frequencies [kHz], a rotation speed [rpm], and an angular error [deg], when rotating a spherical actuator in a Y-axis direction based on controlling phase differences and frequencies of two-phase drive signals which are applied to respective driving force generation units.

Here, the initial phase difference of a two-phase drive signal which is applied to the first driving force generation unit 9a is fixed at 0 deg, the initial phase difference of a two-phase drive signal which is applied to the second driving force generation unit 9b is fixed at +60 deg, and the initial phase difference of a two-phase drive signal which is applied to the third driving force generation unit 9c is fixed at −60 deg. And, all of the frequencies of the drive signals that are applied to the three driving force generation units 9a, 9b, 9c are uniformly shifted from respective resonance frequencies to obtain data.

As shown in FIG. 10, if frequencies of two-phase drive signals which are applied to the three driving force generation units 9a, 9b, 9c are uniformly increased from respective resonance frequencies to the plus side by a predetermined frequency in a stepwise manner, with increase of the frequencies, the rotation speed decreases. In this example, driving at an ultra slow speed, such as 2 [rpm], is possible, and the angular error at this time remains within 4 [deg] and changes little, and the difference is clear compared with a case of using only the phase difference for the control parameter (see FIG. 11). As understood from the present example, according to two-stage control of the present invention, it is possible to move the rotation axis in an intended direction in a relatively low speed rotation.

Note that when frequencies of the two-phase drive signals are in the vicinity of respective resonance frequencies, especially at the minus side, the rotation speed is rapidly decreased due to characteristics of piezoelectric elements constituting driving force generation units, and the change in the angular error is relatively large. Based on this, it is believed that when changing the rotation speed, it is desirable to use the frequency bands at the plus side of respective resonance frequencies. Note that in the present example, 9 measurement points exist on the plus side of respective resonance frequencies including a measurement point on the resonance frequencies, however, by dividing the frequency band into a predetermined number, the rotation speed may be adjusted, for example, in three stages, such as, a high speed, a medium speed, and a low speed.

The above-described series of processing performed at the control unit 31 may be carried out by hardware and by software also. It is needless to say that the function of carrying out the series of processing can be realized by a combination of hardware and software. When the series of processing is carried out by software, a program constituting the software is installed from a program recording medium into a dedicated computer incorporated in hardware, or a general-purpose computer, etc. which is capable of carrying out various functions by installing various kinds of programs.

Also, in the present specification, steps of processing (see FIG. 8) describing a program which is stored in a program recording medium includes steps of processing which are carried out in a chronological order along the described order, but also, steps of processing which are not necessarily carried out in a chronological order but carried out in parallel or individually (for example, by parallel processing or object processing).

Also, the program may be processed by one computer or subjected to distributed-processing by plural computers. Further, the program may be transferred to a remote computer to be executed.

Further, the present invention is not limited to the embodiment described above and illustrated in figure, and various modifications of the embodiment are possible within the scope not departing from the gist of the invention described in claims.

For example, in the above-described embodiment, frequency control is carried out after carrying out phase control of two-phase drive signals, and then two-phase drive signals whose frequencies and phase differences have been adjusted are supplied to three driving force generation units, however, the order of carrying out frequency control and phase control may be reversed. That is, phase control is carried out after carrying out frequency control of two-phase drive signals, and then two-phase drive signals whose frequencies and phase differences have been adjusted are supplied to three driving force generation units.

Also, in the above-described embodiment, description has been made with respect to the constitution that the movable member 5 to which the driving force generation units 9a, 9b, 9c (stators) have been attached rotates in multiple directions around the substantially spherically-shaped support member 3 (rotor), however, the present invention is not limited to this. For example, it may be configured such that a plurality of driving force generation units (stators) contact surfaces of a substantially spherical rotor to which a rotated member has been attached and rotatably support the rotor, and the rotated member attached to the rotor is rotated in multiple directions by rotating the rotor in multiple directions with a plurality of driving force generation units (stators). That is, which of the rotor and the stators is fixed or rotated is a relative matter, and the constitution of the plurality of driving force generation units (stators) to generate driving forces which act on the substantially spherical rotor is the same, so that the present invention can be applied to all spherical ultrasonic motors each including a rotor having a curved surface part and a plurality of stators contacting surfaces of the rotor.

Also, in the above-described embodiment, an example has been described in which three driving force generation units are used as stators, however, the present invention is not limited to this, and four or more stators may be provided.

Also, in the above-described embodiment, an example has been described in which an image pickup unit of an image pickup apparatus is used as a rotated member, however, the present invention is not limited to this. For example, it is conceivable to apply the present invention to a medical robot mounting a laser device as a rotated member to a substantially spherical rotor and irradiating an affected part of the body with a laser at a predetermined low speed. Also, it is conceivable to apply the present invention to an apparatus which requires precise positioning (low speed rotation) like a semiconductor manufacturing apparatus. Thus, the spherical actuator and the control method for the spherical actuator of the present invention can be applied to various other kinds of apparatuses which perform rotation motions.

EXPLANATION OF SYMBOLS

1: spherical actuator, 2: image pickup unit (rotated member), 3: support member, 4: fixing member, 5: movable member, 7: pedestal unit, 7a: mounting surface, 8a, 8b, 8c: arm unit, 9a, 9b, 9c: driving force generation unit, 10: image pickup apparatus, 14: opening, 15: elastic part, 21: fixing unit, 22: support body, 23: contact piece, 24: piezoelectric element (vibration element), 31: control unit, 32a, 32b, 32c: drive signal generation unit, 33: rotation-axis-direction inputting unit, 34: rotation speed inputting unit, 41: oscillation circuit, 42: phase control circuit, 43: drive circuit

The invention claimed is:
1. A spherical ultrasonic motor comprising:
a rotor having a curved surface part;
a plurality of stators which are arranged at predetermined intervals in contact with surfaces of the rotor and to which two-phase drive signals are supplied to generate ultrasonic vibrations;
a plurality of oscillation units which are provided corresponding to the plurality of stators and which generate two-phase drive signals of predetermined frequencies based on inputted frequency control signals;
a plurality of phase control units which are provided corresponding to the plurality of stators and which adjust phase differences of two-phase drive signals generated at the plurality of oscillation units based on inputted phase control signals; and
a control unit which outputs frequency control signals for adjusting frequencies of two-phase drive signals which are generated at the plurality of oscillation units to the target frequencies, to the plurality of oscillation units to cause the plurality of oscillation units to adjust frequencies of two-phase signals which are generated at the plurality of oscillation units to the target frequencies, and outputs phase control signals for adjusting phase differences of two-phase drive signals generated at the plurality of oscillation units to target phase differences, to the plurality of phase control units to cause the plurality of phase control units to adjust phase differences of two-phase drive signals which are generated at the plurality of oscillation units to the target phase differences,
wherein two-phase drive signals whose frequencies have remained unchanged from initial frequencies and whose phase differences have been adjusted to target phase differences are supplied from respective phase control units of the plurality of phase control units to respective corresponding stators, and thereafter, two-phase drive signals whose phase differences have remained unchanged from initial phase differences and whose frequencies have been adjusted to target frequencies are supplied from respective phase control units of the plurality of phase control units to respective corresponding stators concurrently.

2. The spherical ultrasonic motor according to claim 1, wherein the control unit determines the target frequencies such that a ratio of sizes of angular velocity vectors by ultrasonic vibrations generated at respective stators of the plurality of stators, to which the two-phase drive signals have been supplied, whose frequencies and phase differences having been adjusted to the target frequencies and phase differences, respectively, is constant before and after adjusting the frequencies of the two-phase drive signals supplied to the plurality of stators.

3. The spherical ultrasonic motor according to claim 1, wherein the control unit sets a target phase difference of a two-phase drive signal which is supplied to at least one of the plurality of stators at 90°.

4. The spherical ultrasonic motor according to claim 1, further comprising:
a rotation-axis-direction inputting unit which gives an instruction regarding a direction of a rotation axis of the rotor; and
a rotation speed inputting unit which gives an instruction regarding a rotation speed of the rotor;
wherein the control unit outputs phase control signals that are based on the instruction regarding the direction of the rotation axis of the rotor from the rotation-axis-direction inputting unit, to the plurality of phase control units, and frequency control signals that are based on the instruction regarding the rotation speed of the rotor from the rotation speed inputting unit, to the plurality of oscillation units.

5. The spherical ultrasonic motor according to claim 1, wherein the plurality of stators includes three stators.

6. The spherical ultrasonic motor according to claim 1, wherein the rotor is formed in a substantially spherical shape.

7. A control method for a spherical ultrasonic motor, comprising:
- a first step that a control unit of the spherical ultrasonic motor determines target phase differences of two-phase drive signals to be supplied to a plurality of stators contacting surfaces of a rotor of the spherical ultrasonic motor, based on a target direction of a rotation axis of the rotor, and generates phase control signals for adjusting phase differences of the two-phase drive signals to be supplied to the plurality of stators to the target phase differences;
- a second step that the control unit determines target frequencies of two-phase drive signals to be supplied to the plurality of stators, based on a target rotation speed of the rotor, and generates frequency control signals for adjusting frequencies of two-phase drive signals to be supplied to the plurality of stators to the target frequencies;
- a third step of inputting respective frequency control signals generated in the second step to respective oscillation units of a plurality of oscillation units provided corresponding to the plurality of stators and configured to generate two-phase drive signals to be supplied to the plurality of stators, adjusting frequencies of two-phase drive signals to be supplied to the plurality of stators, which are generated at the plurality of oscillation units, to the target frequencies, at the plurality of the oscillation units, and outputting the two-phase drive signals to be supplied to the plurality of stators, whose frequencies have been adjusted to the target frequencies, from the plurality of oscillation units, respectively;
- a fourth step of inputting respective phase control signals generated in the first step to respective phase control units of a plurality of phase control units provided corresponding to the plurality of stators, adjusting phase differences of the two-phase drive signals outputted from the plurality of oscillation units to the target phase differences at the plurality of phase control units, and outputting the two-phase drive signals to be supplied to the plurality of stators, whose phase differences have been adjusted to the target phase differences, from the plurality of phase control units; and
- a fifth step of supplying two-phase drive signals whose frequencies have remained unchanged from initial frequencies and whose phase differences have been adjusted to target phase differences by the third step and the fourth step, from respective phase control units of the plurality of phase control units to respective corresponding stators; and
- a sixth step of supplying two-phase drive signals whose phase differences have remained unchanged from initial phase differences and whose frequencies have been adjusted to target frequencies by the third step and the fourth step, from respective phase control units of the plurality of phase control units to respective corresponding stators, concurrently, after completion of the fifth step.

8. The method according to claim 7, wherein in the second step, the target frequencies are determined such that a ratio of sizes of angular vectors by ultrasonic vibrations generated at respective stators of the plurality of stators, to which the two-phase drive signals have been supplied, whose frequencies and phase differences having been adjusted to the target frequencies and phase differences, respectively, is constant before and after adjusting the frequencies and the phase differences of the two-phase drive signals supplied to the plurality of stators.

* * * * *